No. 757,838. PATENTED APR. 19, 1904.
F. P. PFLEGHAR.
CURTAIN FASTENER.
APPLICATION FILED NOV. 2, 1903.
NO MODEL.
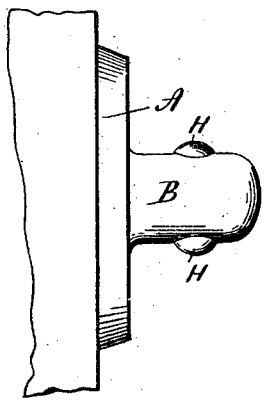
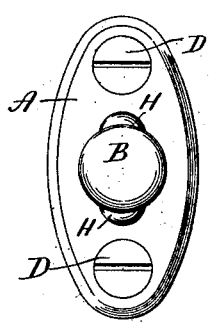
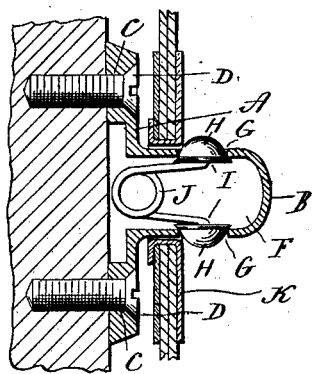
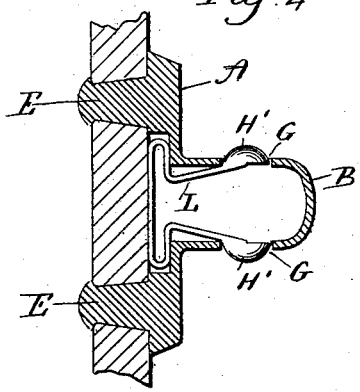

No. 757,838. Patented April 19, 1904.

UNITED STATES PATENT OFFICE.

FRANK P. PFLEGHAR, OF NEW HAVEN, CONNECTICUT, ASSIGNOR TO THE ENGLISH & MERSICK CO., OF NEW HAVEN, CONNECTICUT, A CORPORATION.

CURTAIN-FASTENER.

SPECIFICATION forming part of Letters Patent No. 757,838, dated April 19, 1904.

Application filed November 2, 1903. Serial No. 179,479. (No model.)

*To all whom it may concern:*

Be it known that I, FRANK P. PFLEGHAR, of New Haven, in the county of New Haven and State of Connecticut, have invented a new and useful Improvement in Curtain-Fasteners; and I do hereby declare the following, when taken in connection with the accompanying drawings and the letters of reference marked thereon, to be a full, clear, and exact description of the same, and which said drawings constitute part of this specification, and represent, in—

Figure 1, a top or plan view of a curtain-fastener constructed in accordance with my invention; Fig. 2, a side view of the same; Fig. 3, a sectional view showing a gromet connected with the fastener; Fig. 4, a sectional view of the modified form of spring for the plungers.

This invention relates to an improvement in curtain-fasteners, and by the term "curtain-fasteners" I wish to be understood as including carriage-curtains, boots, and other devices used on carriages, automobiles, electric cars, and other places where flexible curtains or similar devices are required, the object of the invention being a simple construction to be used in connection with a gromet and which will firmly hold the gromet, yet permit it to be readily connected or disconnected; and the invention consists in the construction as hereinafter described, and particularly recited in the claims.

In carrying out my invention I employ a plate A and post B, of metal, rubber, or other suitable material. This plate may be round or oval and the post correspondingly shaped, and the plate will be flat on its under face or concave, according to the surface to which it is to be attached. The plate may be provided with holes C to receive screws D for attachment to wood or metal, as shown in Figs. 1 and 3, or it may be provided with prongs E, by which the plate may be riveted to cloth, leather, or other flexible material, as shown in Fig. 4. The post B is hollow, forming a chamber F, which opens through the plate A, and in opposite sides of the post near the outer end are holes G. Projecting outward through these holes and so as to extend beyond the outer face of the post are knobs or plungers H. These plungers will preferably be connected with the ends I of a coiled spring J, as clearly shown in Fig. 3. These plungers are inserted by pressing them together and passing them into the post B through the back of the plate A, and when in line with the openings G the spring forces them outward and holds them in position, yet permits them to be pressed inward substantially flush with the outer surface of the post. This fastening device is used in connection with the usual metal gromet K, the hole through which corresponds, substantially, to the size and shape of the post B. As the gromet is passed over the post the plungers H are forced inward, allowing the gromet to freely pass over them, and when passed beyond the plungers the plungers spring outward, so as to hold the gromet close to the plate A. Instead of forming the plungers independently and connecting them with a wire spring they may be formed integral with the ends of a sheet-metal spring, as shown in Fig. 4, in which the plungers H' are shown as formed by striking up the ends of a sheet-metal spring L, or the plungers may be formed independently and secured to the ends of the sheet-metal spring.

I am aware that curtain-fasteners have been produced comprising a post and spring fastening devices connected therewith, and do not wish to be understood as claiming, broadly, such as my invention.

Having fully described my invention, what I claim as new, and desire to secure by Letters Patent, is—

1. A curtain-fastener comprising a plate and a post, said post made with a chamber opening through said plate, said post formed with holes in opposite sides, plungers projecting through said holes beyond the outer surface of said post, said plungers secured to the ends of a spring seated within said chamber, substantially as described.

2. A curtain-fastener comprising a plate and a post, said post made with a chamber opening through said plate, said post formed with holes in opposite sides, plungers projecting through said holes beyond the outer surface of said post, said plungers secured to the ends of a coiled spring seated within said chamber, substantially as described.

In testimony whereof I have signed this specification in the presence of two subscribing witnesses.

FRANK P. PFLEGHAR.

Witnesses:
F. P. PFLEGHAR, Jr.,
JOHN B. KENNEDY.